(No Model.)
J. H. SAGER.
SUPPLEMENTARY SEAT FOR BICYCLES.
No. 500,157. Patented June 27, 1893.
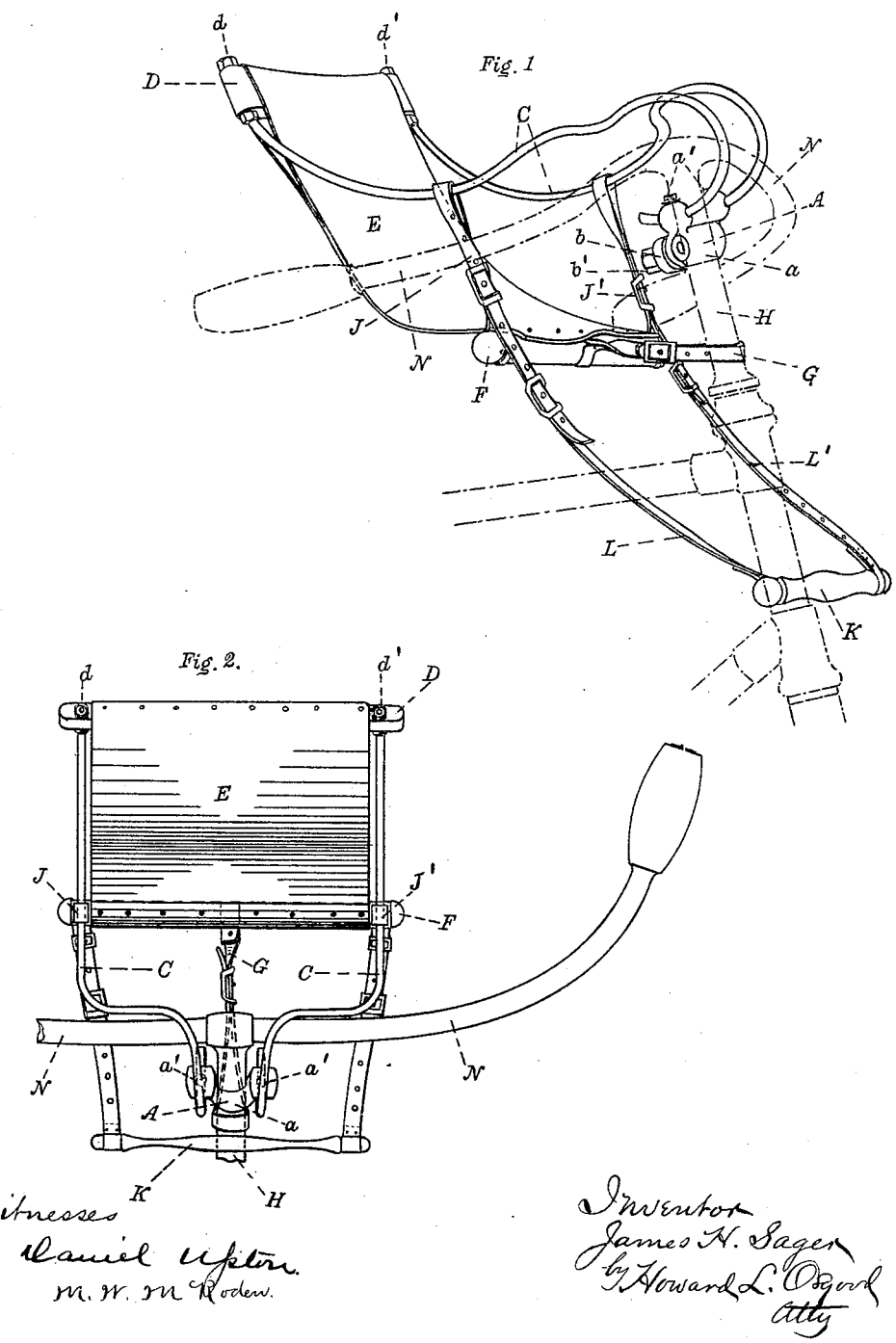

UNITED STATES PATENT OFFICE.

JAMES H. SAGER, OF ROCHESTER, NEW YORK, ASSIGNOR TO THE RICH & SAGER COMPANY, OF SAME PLACE.

SUPPLEMENTARY SEAT FOR BICYCLES.

SPECIFICATION forming part of Letters Patent No. 500,157, dated June 27, 1893.

Application filed September 23, 1892. Serial No. 446,732. (No model.)

*To all whom it may concern:*

Be it known that I, JAMES H. SAGER, a citizen of the United States, and a resident of the city of Rochester, in the county of Monroe and State of New York, have invented certain new and useful Improvements in Supplementary Seats for Bicycles, of which the following is a specification, reference being had to the accompanying drawings, in which—

Figure 1, is a perspective view of my device, showing in dotted lines the position of the head of the bicycle to which it is attached. Fig. 2, is a plan view thereof.

My invention relates to the improvements in supplementary seats for bicycles, hereinafter described and claimed, and the object thereof is to provide a cheap yet elastic, strong and safe seat, which may be attached to bicycles of different forms, and which may be easily adjusted thereto.

In the drawings A represents a clamp consisting of two parts: a main part $a$, and a clamp section $b$; it is also provided with set screws $b'$ $b'$ which fasten the clamp section to the main part for grasping the head H of the bicycle between them under the handle bars N. In the main part $a$, of this clamp, are two perforations parallel to each other and longitudinal with reference to the bicycle, and having set screws $a'$ $a'$ adapted to bind the seat supporting rods passing through said last named perforations. These seat supporting rods C C are bent preferably in uniform curves from their free ends near which they are fastened in the perforations by the set screws $a'$ $a'$, then pass forward curving upward in front of the handle bars and backward over the same, spreading outward on either side and then pass still backward, parallel if so desired, and in rising curves to the back bar D, to which these rods are fastened in any suitable manner, as, for instance, by set nuts $d$ $d'$. It is obvious that the rods may be continued in one piece to form the back bar. A strip of flexible material E, of a width and length suitable for the seat, is fastened to the back bar and extends forward from said back bar to the front stretching bar F, to which the strip is also fastened. A stay such as a strap G is provided by which the stretching bar F is adjustably stayed to the head or steering post H. Other stays are provided by which the ends of the stretching bar F are adjustably stayed to the supporting rods C C. I prefer to use for this purpose straps J J', passing around the bar F and around the rods C C.

A foot rest K, is adjustably fastened to the ends of the stretcher bar, as by straps L, L'. This foot rest I prefer to place in front of the head of the bicycle in substantially the position shown in the drawings. The seat occupies the space immediately behind the handle bars.

I thus produce a supplementary seat for bicycles which is light, having little metal in it, the back bar D, stretching bar F, and foot rest K, being preferably made of wood (although they may obviously be of metal), the stays being preferably made of leather and the seat material E, being preferably made of canvas or similar material. The supporting rods C C are made of spring metal, and are sufficiently heavy and elastic to bear any ordinary weight which may be placed upon the seat.

This device is easy and cheap to manufacture, is very simple, is adjustable as to the position of the seat, by reason of the adjustability of the several stays or straps, and is adjustable for height with reference to the bicycle by moving the clamp A upward and downward on the head of the bicycle, and is adjustable for inclination by adjusting the curved forward ends of the rods C C in the perforations in the clamp A, provided for them.

What I claim is—

1. In a supplementary seat for bicycles, the combination of a main clamp adapted to be fastened to the head of a bicycle, a pair of elastic rods extending from said clamp backward from said head and a seat suspended at its back from said rods and at its front adjustably suspended from said rods, substantially as described.

2. In a supplementary seat for bicycles, the combination of a main clamp adapted to be fastened to the head of a bicycle, a pair of curved supporting rods fastened in and passing through said clamp and extending therefrom forward, upward and then backward over the steering handles and a seat suspended at its back from said rods and at its front adjustably suspended from said rods, substantially as described.

3. In a supplementary seat for bicycles the combination of a main clamp adapted to be fixed to the head of a bicycle; a pair of elastic rods adjustably fastened in said clamp, passing in suitable curves forward, upward and then backward, a back bar, a strip of flexible material to form the seat proper, fastened to said back bar at one end, and to a stretcher bar at the other end, and means of staying said stretcher bar to said supporting rods and to the head of the bicycle, substantially as described.

4. In a supplementary seat for bicycles the combination of a main clamp adapted to be fixed to the head of a bicycle, a pair of elastic rods adjustably fastened in said clamp passing in symmetrical curves forward, upward and over the handle bars, and then backward, a back bar fastened to the ends of said rods, a strip of flexible material to form the seat proper, fastened to said back bar at one end, and to a stretcher bar at the other end, and means of staying said stretcher bar to said supporting rods and to the head of the bicycle, as by straps, substantially as described.

JAMES H. SAGER.

Witnesses:
M. H. McMATH,
H. S. DURAND.